(12) United States Patent
Kolodziej et al.

(10) Patent No.: US 6,406,243 B1
(45) Date of Patent: Jun. 18, 2002

(54) WASHER WITH DOME PROFILE

(75) Inventors: Norbert K. Kolodziej, Park Ridge; Kevin M. Tucker, Chicago; Larry Reinebach, Glen Ellyn, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/813,657

(22) Filed: Mar. 21, 2001

(51) Int. Cl.[7] ............................. F16B 43/00; E04B 1/00
(52) U.S. Cl. .................. 411/533; 411/369; 411/531; 411/542; 52/410; 52/512
(58) Field of Search ................................ 411/368, 369, 411/531, 533, 542; 52/410, 512

(56) References Cited

U.S. PATENT DOCUMENTS 5,607,272 A  3/1997 Olvera et al.
5,688,092 A * 11/1997 Olvera et al. ........... 411/531 X
5,772,381 A *  6/1998 Olvera et al. ........... 411/531 X \* cited by examiner

*Primary Examiner*—Neill Wilson

(57) ABSTRACT

An attachment implement, for use in connection with the mounting of a relatively thin, highly dense insulation panel upon an underlying structural substrate, comprises a washer plate portion and an integral lower body portion which has a substantially inverted dome-shaped or bell-shaped configuration. The axial depth dimension of the implement is relatively shallow or small, and the inverted dome-shaped or bell-shaped configuration advantageously distributes or disperses the compressive forces attendant the mounting of the insulation panel upon the underlying structural substrate whereby desired compression of the insulation panel, and its rigidifying or strength-enhancing membrane, occurs without tearing or cutting of the insulation panel and its membrane so as not to adversely affect the strength, rigidity, and structural integrity of the insulation panel.

20 Claims, 2 Drawing Sheets

WASHER WITH DOME PROFILE

FIELD OF THE INVENTION

The present invention relates generally to building construction implements, and more particularly to a new and improved washer implement for attaching insulation panels to underlying structural substrates.

BACKGROUND OF THE INVENTION

In connection with the erection of building structures, insulation panels are often attached to underlying structural substrates. The insulation panels are adapted to be fixedly secured to the underlying structural substrates by means of suitable attachment devices, such as, for example, specially configured attachment implements comprising washer plates, which overly portions of the insulation panels and which are, in turn, fixedly secured to the underlying structural substrate by means of suitable mechanical fasteners, such as, for example, nails or screws which may be dispensed by means of a suitable power tool. More particularly, the attachment implement usually has a washer plate portion which comprises a radially outwardly extending flanged region which therefore comprises a relatively large surface area, and the attachment implement is mounted upon the insulation panel surface which is disposed opposite that surface of the insulation panel which is disposed in contact with the underlying structural substrate whereupon the fasteners may then be driven through the attachment implement and the insulation panel so as to fixedly secure the attachment implement and the insulation plate to the underlying structural substrate. Often, the insulation panels have substantial or significant thickness dimensions, and when the attachment implement is to be secured to the underlying structural substrate so as to fixedly mount a particular insulation panel upon the underlying structural substrate, it is desired, depending upon the thickness dimension of the particular insulation panel, that the attachment implement be applied with a sufficient amount of force whereby the outer surface portion of the washer plate of the attachment implement will be embedded within the insulation panel so as to be disposed flush with the outer surface portion of the insulation panel or at a level which is recessed or beneath the outer surface portion of the insulation panel. In this manner, a finishing coating can be applied over the washer plate of the attachment implement and the insulation panel so as to provide the building wall with a smooth, uniform, and effectively seamless finished surface appearance.

An attachment implement which satisfactorily meets the aforenoted requirements and criteria is disclosed within U.S. Pat. No. 5,607,272 which issued to Olvera et al. on Mar. 4, 1997. As disclosed within FIG. 1 of the present patent application drawings, which corresponds to FIG. 7 of the aforenoted United States Patent, the patented attachment implement is designated at 1 and is adapted to secure, for example, an insulation panel 57 to an underlying building substrate 59. More particularly, the attachment implement 1 is constructed as a tubular piece which is seen to comprise a radially outwardly extending washer plate 7. The attachment implement 1 is provided with a central opening for receiving a nail fastener 77, and the washer plate 7 is provided with a plurality of circumferentially spaced apertures 9. The attachment implement 1 further comprises a tubular member 11 which, in turn, comprises four sections 13,15,17,19 arranged in a serial manner along the axis 3 of the implement 1.

The first section 13 of the tubular member 11 includes an annular wall member 21, a radially inwardly projecting annular base portion 24, and a plurality of flexible fingers 47 for covering the nail fastener 77 when the fastener 77 has been installed. The wall member 21, base portion 24, and fingers 47 serve to define an annular chamber 51 within which a pilot portion of a power tool is adapted to be disposed so as to be capable of mounting or fixing the attachment implement 1 to the underlying building substrate 59 so as to, in turn, mount the insulation panel 57 upon the underlying substrate 59. The second section 15 of the attachment implement 1 serves to house or confine a nail collating ring 79, the third section 17 of the attachment implement 1 serves to define an axial passage 31 for guiding insertion of the nail fastener 77, and the fourth section 19 of the attachment implement 1 serves to actually mount the attachment implement 1 upon the underlying substrate 59. When the attachment implement 1 is fixedly mounted upon the underlying substrate 59 so as to, in turn, fixedly secure the insulation panel 57 to the underlying substrate 59, the coating material 81 can then be applied over the attachment implement 1 and the insulation panel 57 so as to form the uniform seamless outer wall surface. It is also seen that some of the coating material 81 is deposited within the circumferentially arranged apertures 9 of the washer plate 7 which serves to provide additional adhesion of the coating material 81 to the insulation panel 57.

While the aforenoted attachment implement 1 has been quite satisfactory and commercially successful in connection with the installation of different insulation panels having different thickness dimensions, newly fabricated insulation panels, having different thickness dimensions and density characteristics than those of the insulation panels previously used in the industry and as disclosed within the aforenoted United States Patent, are currently being used within the industry. For example, while the aforenoted previously used insulation panels were fabricated, for example, from expanded polystyrene (EPS), which is conventionally or commonly known as STYROFOAM®, other insulation panels are currently being used, because of enhanced insulating properties, is fabricated from polyisocyanurate and extruded polystyrene which renders the fabricated insulation panels thinner and denser. In addition, a suitable membrane is desired to be utilized in conjunction with such newly fabricated insulation panels so as to enhance the rigidity, strength, and structural integrity of the composite insulation panels. However, the attachment implement as disclosed within the aforenoted U.S. Pat. No. 5,607,272 is not capable of being utilized in conjunction with such newly fabricated insulation panels because the axial depth of the patented attachment implement is much greater than the thickness dimension of the newly fabricated insulation panels.

Accordingly, if the patented attachment implement was to be utilized in conjunction with the newly fabricated insulation panels, when the lower end portion of the tubular attachment implement is mounted upon the underlying substrate after being driven through the insulation panel, the outer surface portion of the washer plate would be disposed above the outer surface portion of the insulation panel so as not to be capable of either being flush with the outer surface portion of the insulation panel or disposed in a recessed manner with respect to the outer surface portion of the insulation panel whereby the outer coating material is not then capable of being applied over the outer surface portions of the attachment implement washer plate and the insulation panel so as to achieve the aforenoted continuous and seamless finished surface to the building wall or structure. In addition, in view of the fact that the lower end portion of the attachment implement, which is adapted to be seated upon the underlying substrate, has a relatively narrow width dimension and comprises a relatively sharp annular edge or corner region, it has been experienced that when the attachment implement is driven so as to become embedded in the insulation panel, the leading or lower end portion of the attachment implement cuts or tears the membrane thereby jeopardizing or adversely affecting the rigidity, strength, and structural integrity of the composite insulation panel.

A need therefore exists in the art for a new and improved insulation panel attachment implement which comprises an axial stem or protrusion portion which has a relatively small axial length or depth so as to be capable of being used to secure insulation panels having relatively small thickness dimensions, and wherein further, the geometrical configuration of the axial stem or protrusion portion is such as to have rounded contours so as not to tear or cut the external membrane employed in conjunction with the insulation panel while also uniformly distributing the compressive loads over a relatively wide radial expanse in accordance with an optimal distribution pattern so as not to adversely affect the rigidity, strength, and structural integrity of the insulation panel by means of excessive concentrated compressive loading.

OBJECTS OF THE INVENTION

Accordingly, it is an object of the present invention to provide a new and improved attachment implement for use in connection with the attachment of insulation panels to underlying structural substrates.

Another object of the present invention is to provide a new and improved attachment implement for use in connection with the attachment of insulation panels to underlying structural substrates which effectively overcomes the various operational disadvantages and drawbacks characteristic of prior art insulation panel attachment implements.

An additional object of the present invention is to provide a new and improved attachment implement for use in connection with the attachment of insulation panels to underlying structural substrates which effectively overcomes the various operational disadvantages and drawbacks characteristic of prior art insulation panel attachment implements by providing the attachment implement with a relatively small or shallow axial extent or depth dimension whereby the attachment implement can be utilized in conjunction with newly developed relatively thin, highly dense insulation panels.

A further object of the present invention is to provide a new and improved attachment implement for use in connection with the attachment of insulation panels to underlying structural substrates which effectively overcomes the various operational disadvantages and drawbacks characteristic of prior art insulation panel attachment implements by providing the attachment implement with an axial protrusion section which has a round contoured external shape or configuration whereby the attachment implement can be utilized in conjunction with newly developed relatively thin, highly dense insulation panels in view of the fact that the rounded axial protrusion portion of the attachment implement does not tear or cut the external membrane employed in conjunction with the insulation panel, and in addition, the protrusion portion will also uniformly distribute the compressive loads impressed thereon during an installation operation over a relatively wide radial expanse in accordance with an optimal distribution pattern so as not to adversely affect the rigidity, strength, and structural integrity of the insulation panel by means of excessive concentrated compressive loading.

SUMMARY OF THE INVENTION

The foregoing and other objectives are achieved in accordance with the teachings and principles of the present invention through the provision of a new and improved insulation panel attachment implement which comprises a washer plate or flanged portion having a predetermined radial expanse for engaging an outer surface of an insulation panel to be secured to an underlying structural substrate, and an axial protrusion portion which is integral with the flanged washer portion and through which the fastener, for fixedly securing the insulation panel to the underlying structural substrate, is adapted to be inserted and retained. The axial extent or depth of the axial protrusion portion is relatively small or shallow so as to permit the attachment implement to be used in securing those insulation panels, which are characterized by means of relatively small thickness dimensions, to underlying structural substrates, and in addition, the protrusion portion has a substantially inverted bell-shaped configuration whereby the rounded contours of such protrusion portion will not cut or tear membranes employed in conjunction with the insulation panels, and still further, can uniformly distribute the compressive loading over a relatively wide expanse so as not to adversely affect the rigidity, strength, and structural integrity of the insulation panel by means of excessive concentrated compressive loading.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
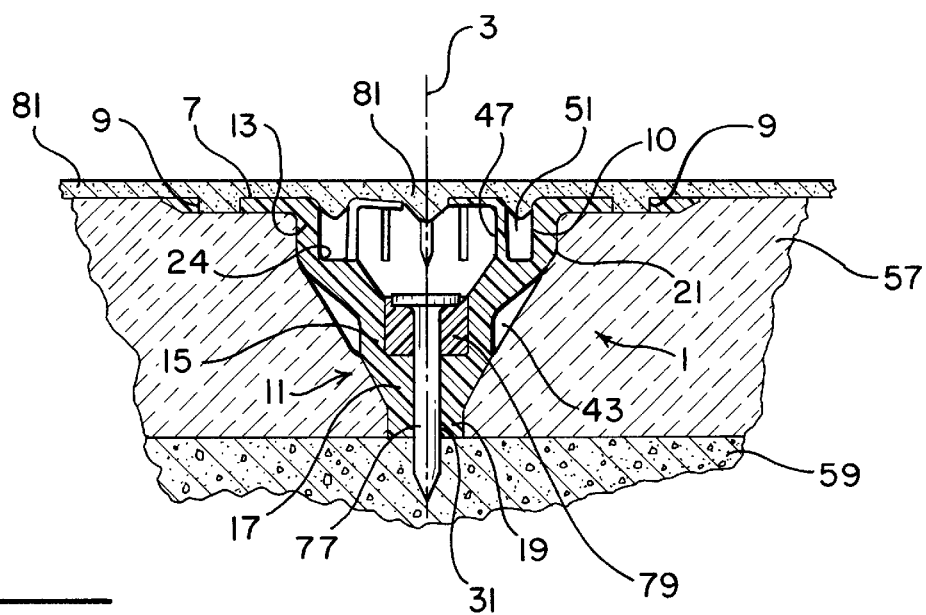
FIG. 1 is a cross-sectional view of the PRIOR ART attachment implement disclosed within U.S. Pat. No. 5,607,272 showing the use of such PRIOR ART attachment implement in connection with the attachment of an insulation panel to an underlying structural substrate.
Figure 3:
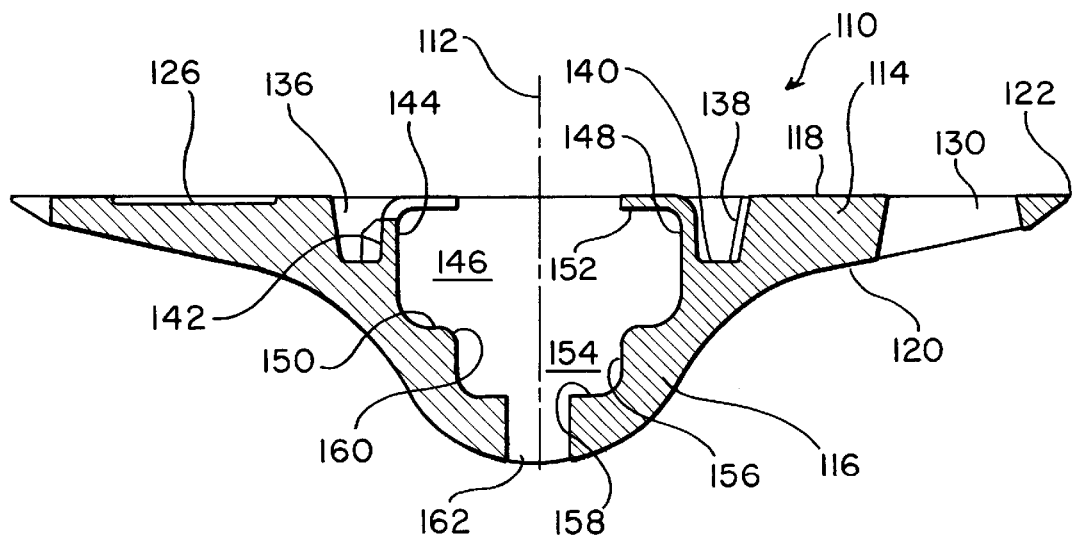
FIG. 3 is a cross-sectional view of the new and improved attachment implement as illustrated in FIG. 2 and as taken along the lines 3—3 of FIG. 2.
Figure 2:
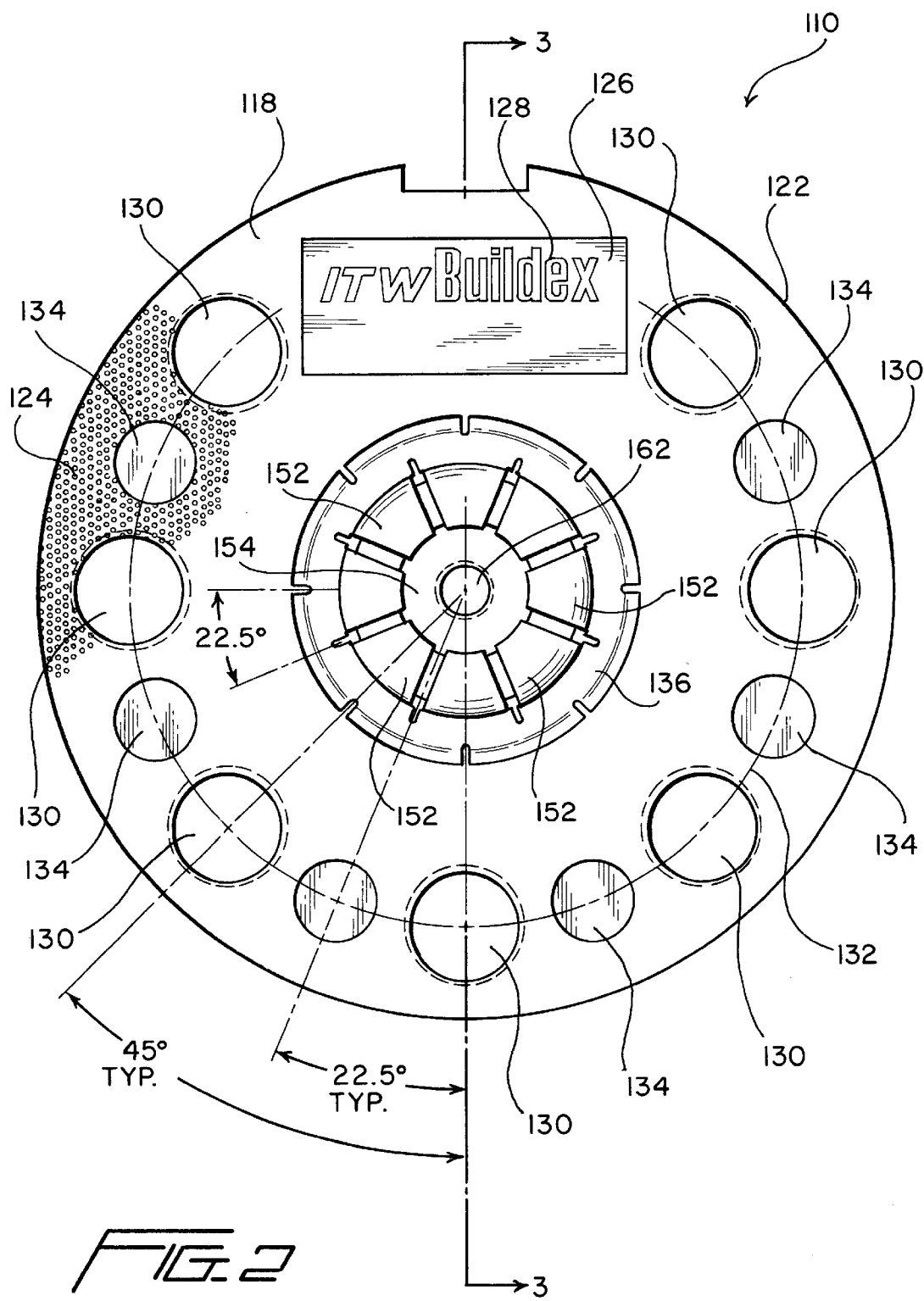
FIG. 2 is a top plan view of the new and improved attachment implement constructed in accordance with the principles and teachings of the present invention for use in connection with the attachment of insulation panels to underlying structural substrates.

Referring now to the drawings, and more particularly to FIGS. 2 and 3 thereof, the new and improved attachment implement, constructed in accordance with the principles and teachings of the present invention for use in connection with the attachment of insulation panels to underlying structural substrates, is disclosed and is generally indicated by the reference character 110. As can best be appreciated from FIG. 3, the attachment implement 110 is seen to comprise an annular structure which is formed about a central vertical axis 112, and the entire attachment implement 110 is preferably fabricated, for example, from polypropylene so as not to be susceptible to cracking under substantially cold temperature weather conditions. More particularly, the attachment implement 110 is seen to comprise an upper section 114 which comprises in effect a relatively flat or planar washer plate, and a lower body portion 116 which is integrally connected to the upper washer plate section 114 and which has a substantially inverted dome or inverted bell-shaped configuration. The upper surface portion 118 of the washer plate section 114 is substantially planar, while the undersurface portion 120 of the washer plate section 114 tapers away from the planar surface 120 such that the washer plate section 114 exhibits a progressively increased thickness dimension as one proceeds radially inwardly from the outer peripheral edge region 122 toward the central axis 112. In this manner, the undersurface portion 120 of the washer plate section 114 can smoothly integrate into, and be smoothly continuous with respect to, the inverted dome or inverted bell-shaped body portion 116. As can also be readily seen and appreciated from FIG. 2, the upper planar surface portion 118 of the washer plate section 114 is provided with a multitude of dimples 124, or the like, which are formed during the molding process by means of which the attachment implement 110 is fabricated. The provision or presence of such dimples 124 upon the upper planar surface portion 118 of the washer plate section 114 provides the same with substantially coarse or textured characteristics by means of which the adherence of an outer or external finishing coating, similar to the outer finishing coating 81 used in conjunction with the PRIOR ART attachment implement 1 as disclosed within FIG. 1, is enhanced.

With reference still being made to FIG. 2, the upper planar surface portion 118 of the washer plate section 114 is also provided with a relatively shallow recessed region 126 upon which, for example, a corporate logo 128 may be formed or provided, and the washer plate section 114 is seen to further comprise a plurality of circumferentially spaced apertures 130 which are formed adjacent to the outer peripheral edge region 122 and which are arranged upon a circular locus 132. In addition to providing a predetermined amount of flexibility to the washer plate section 114 of the implement 110, the holes or apertures 130 also serve to contain or house portions of the outer or external finishing coating, similar to the outer finishing coating 81 used in conjunction with the PRIOR ART attachment implement 1 as disclosed within FIG. 1, when such outer or external finishing coating is applied over the washer plate section 114 after the attachment implement 110 has been used to secure an insulation panel to an underlying structural substrate. In this manner, the adherence of such outer or external finishing coating, with respect to the insulation panel, will likewise be enhanced. Interposed between each adjacent pair of holes or apertures 130, and located upon the same circular locus 132, there is also provided a plurality of slightly recessed circular regions 134 which are adapted to respectively receive or, in effect, respectively support, a plurality of knock-out pins, not shown, which are employed in conjunction with the molding apparatus so as to facilitate the removal or ejection of the molded attachment implements 110 from the mold dies. As can be seen from FIG. 2, the holes or apertures 130 are separated from each other through means of an arcuate extent of 45°, while each hole or aperture is separated from an adjacent one of the knockout pin regions 134 through means of an arcuate extent of 22.5°. Accordingly, in a manner similar to the arcuate separation defined between adjacent pairs of holes or apertures 130, the knock-out pin regions or locations 134 are likewise separated from each other through means of an arcuate extent of 45°.

With additional reference again being made to FIG. 3, the washer plate section 114 is seen to comprise, within a substantially central portion thereof, an annular chamber 136 which is defined within an outer surface portion of the washer plate section 114 by means of a radially outer, vertically oriented annular wall 138, a horizontally oriented annular floor or base portion 140, and a radially inner, vertically oriented annular wall 142 which is actually formed, in effect, by means of a plurality of adjacent radially outer annular surface portions of a plurality of circumferentially spaced fingers 144. In turn, the central inverted domed or bell-shaped body portion 116 is seen to comprise or define an internally stepped structure, and in particular, it is seen that the axially upper or outer portion of the domed or bell-shaped body portion 116 structurally cooperates with the washer plate section 114 in defining a first upper chamber 146 which has a relatively large diametrical extent. More particularly, first upper chamber 146 is defined by means of a vertically oriented annular wall 148 which is partially formed by means of radially inner surface portions of the circumferentially spaced fingers 144, a horizontally oriented annular floor or base portion 150, and horizontally oriented overhanging finger portions 152 each of which is seen to have a substantially trapezoidal configuration. A second axially intermediate chamber 154, having a diametrical extent which is less than the diametrical extent of the first upper chamber 146, is similarly formed by means of a vertically oriented annular wall member 156 and a horizontally oriented annular floor or base portion 158, annular wall member 156 of chamber 154 being structurally connected to annular floor portion 150 of chamber 146 by means of an annular shoulder portion 160. Lastly, the axially lowest portion of the domed or bell-shaped body portion 116 is provided with an axial through-bore 162.

As was the case with the conventional or PRIOR ART attachment implement 1 illustrated within FIG. 1, when the attachment implement 110 is to be used in conjunction with the mounting and fixing of an insulation panel upon an underlying structural substrate, annular chamber 136 will accommodate, for example, an adapter pilot member of an installation tool, as more particularly disclosed within the aforenoted U.S. Pat. No. 5,607,272, while upper chamber 146 similarly accommodates the muzzle portion of the installation tool, the overhanging finger portions 152 resiliently bending downwardly so as to accommodate the muzzle portion of the tool during the fastener installation operation. In addition, a collating ring is adapted to be seated within the intermediate chamber 154 of the attachment implement 110 in conjunction with the driven installation of a nail type fastener through the bore or passageway 162 of the attachment implement 110 when the nail type fastener is being driven through the attachment implement 110, the insulation panel, and into the underlying structural substrate so as to in fact secure the insulation panel to the underlying structural substrate.

While it is therefore apparent that the attachment implement 110, constructed in accordance with the principles and teachings of the present invention, is somewhat similar to the conventional or PRIOR ART attachment implement 1 disclosed within the aforenoted U.S. Pat. No. 5,607,272, particularly with respect to the washer plate section 114 as compared to the washer plate 7 of the conventional or PRIOR ART attachment implement 1, the body portion 116 of the attachment implement 110 of the present invention is quite different from the body or tubular portion 11 of the conventional or PRIOR ART attachment implement 1. More specifically, as has been noted hereinbefore, the new and improved attachment implement 110 is adapted to be used in conjunction with the mounting of insulation panels, upon underlying structural substrates, which have different chemical compositions, insulation properties, and density characteristics than those of the insulation panels used heretofore and as disclosed at 57 within FIG. 1. Insulation panel 57 is fabricated, for example, from expanded polystyrene (EPS), or STYROFOAM®, however, it is currently desired to use or employ insulation panels which are fabricated from polyisocyanurate or extruded polystyrene because such insulation panels have greater density parameters or characteristics which enables the panels to pro-vide enhanced insulation properties. Due to the greater density characteristics, the insulation panels have smaller depth or thickness dimensions than the conventional or PRIOR ART insulation panel 57 disclosed within FIG. 1.

Accordingly, for example, the conventional or PRIOR ART attachment implement 1, which has been used in conjunction with the attachment of insulation panel 57 to the underlying structural substrate 59 and which has an axial depth dimension of, for example, 0.75 inches, cannot be used in conjunction with the attachment of the polyisocyanurate or extruded polystyrene insulation panel to an underlying structural substrate in view of the fact that the axial depth dimension of the attachment implement 1 is greater than the depth or thickness dimension of the polyisocyanurate or extruded polystyrene insulation panel whereby the attachment implement 1 would not be able to be properly seated upon the polyisocyanurate or extruded polystyrene insulation panel in a manner similar to that illustrated in connection with the conventional or PRIOR ART insulation panel 57 as shown in FIG. 1. Accordingly, in accordance with the principles and teachings of the present invention, the attachment implement 110 of the present invention is provided with an axial depth dimension which is less than the axial depth dimension of the conventional or PRIOR ART attachment implement 1, wherein, more particularly, the axial depth dimension of the attachment implement 110 is, for example, 0.50 inches.

Still further, when the insulation panel, fabricated from the aforenoted polyisocyanurate material, is manufactured, it has a suitable membrane, such as, for example, fiberglass, or the like, integrally secured or bonded to an outer surface of the insulation panel so as to enhance the rigidity or strength characteristics of the insulation panel. However, it is additionally noted that when the conventional or PRIOR ART attachment implement 1 is used in connection with the mounting of the insulation panel 57 upon the underlying structural substrate 59, the lower section 19 of the attachment implement 1 has an axially projecting con-figuration which includes an annular, sharp-cornered end face which is adapted to penetrate the insulation panel 57. In addition, the attachment implement 1 further comprises fin structures 43 which are adapted to cut the insulation panel 57 and facilitate the penetration process. Accordingly, if an attachment implement similar to the attachment implement 1 is used in conjunction with the polyisocyanurate insulation panel, the sharp-cornered end section 19 of the attachment implement 1 would cut the outer fiberglass membrane of the insulation panel thereby adversely affecting the rigidity, strength, and structural integrity of the insulation panel. Therefore, in accordance with the principles and teachings of the present invention, the lower body portion 116 of the attachment implement 110 is specially structured so as to have a substantially inverted dome-shaped or bell-shaped configuration. Consequently, unlike the conventional or PRIOR ART attachment implement 1, and particularly the lower end section 19 as well as the fin structure 43 thereof, the attachment implement 110 is not structured to, and does not, cut or penetrate the polyisocyanurate insulation panel, and/or its outer rigidifying fiberglass membrane or the extruded polystyrene, but to the contrary, when the attachment implement 110 is used to attach or mount an insulation panel to an underlying structural substrate, the inverted dome-shaped or bell-shaped lower body portion 116 of the attachment implement 110 simply compresses the insulation panel, and the outer membrane integrally secured thereto.

Accordingly, in view of the shorter axial depth dimension of the attachment implement 110, as compared to the axial depth dimension of the conventional or PRIOR ART attachment implement 1, the attachment implement 110 can be properly utilized in conjunction with the polyisocyanurate or extruded polystyrene insulation panel in order to be properly seated upon the insulation panel, and to in turn, properly seat the insulation panel upon the underlying structural substrate. In addition, due to the provision of the lower body portion 16 of the attachment implement 110 with the aforenoted inverted dome-shaped or bell-shaped configuration, no cutting or penetration of the insulation panel, or its strength-enhancing fiberglass membrane, occurs so as not to adversely affect the rigidity, strength, and structural integrity of the insulation panel. Still further, the provision of the inverted dome-shaped or bell-shaped lower body portion 16 of the attachment implement 10 critically distributes or advantageously disperses the compressive forces generated during the fastener driving operation and compressive movement of the attachment implement 110 into and with respect to the insulation panel such that the compressive forces are impressed upon the insulation panel in a substantially uniform and radially outwardly dispersed manner. In this manner, the insulation panel is not adversely affected by means of compressive forces which would otherwise be concentrated substantially along the axis 112.

Thus, it may be seen that in accordance with the principles and teachings of the present invention, a new and improved attachment implement for mounting and securing an insulation panel to an underlying structural substrate has been provided whereby the same is provided with a relatively shallow or shortened axial depth dimension so as to be capable of being used in conjunction with the attachment of relatively thin, highly dense insulation panels to underlying structural substrates. The lower body portion of the attachment implement is provided with an inverted dome-shaped or bell-shaped configuration so as to advantageously distribute or disperse the compressive forces attendant the mounting or installation operation, and in addition, the inverted dome-shaped or bell-shaped configuration prevents the cutting or tearing of the insulation panel, and its integral fiberglass membrane, so as not to adversely affect the rigidity, strength, and structural integrity of the insulation panel.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America is:

1. An attachment implement for attaching an insulation panel to an underlying structural substrate, comprising:
    a washer plate member, having a predetermined diametrical extent defined around a central axis, for engaging an outer surface portion of an insulation panel to be secured to an underlying structural substrate; and a body portion integrally connected to a substantially axial central region of said washer plate member, wherein said body portion has a substantially inverted, rounded domed-shaped configuration defined by radiused external surface regions circumferentially symmetrical around said central axis for uniformly distributing the compressive forces, attendant the mounting of the insulation panel upon the underlying structural substrate, in a radially outwardly direction, and for engaging the insulation panel so as to be capable of compressing the insulation panel without damaging the same by otherwise axially concentrated forces.

2. The attachment implement as set forth in claim 1, wherein:

an annular chamber is defined within said washer plate member for accommodating an adapter pilot implement of a power tool which is used for driving a fastener into the attachment implement and the underlying structural substrate so as to securely mount the insulation panel upon the underlying structural substrate.

3. The attachment implement as set forth in claim 2, wherein:

said annular chamber is defined within an outer surface portion of said washer plate member.

4. The attachment implement as set forth in claim 2, wherein:

a first axially central chamber defined within said attachment implement for accommodating a muzzle portion of the power tool and thereby operatively cooperating with said annular chamber defined within said washer plate member for accommodating the adapter pilot implement of the power tool such that the power tool is properly positioned and seated with respect to said attachment implement in order to properly drive a fastener into the attachment implement and the underlying structural substrate so as to securely mount the insulation panel upon the underlying structural substrate.

5. The attachment implement as set forth in claim 4, wherein:

a plurality of resilient fingers radially separate said annular chamber from said first axially central chamber and include substantially trapezoidal configured portions which partially overhang said first axially central chamber.

6. The attachment implement as set forth in claim 4, further comprising:

a second axially central chamber defined within said attachment implement and openly connected to said first axially central chamber for accommodating a collating ring operatively associated with the fastener in order to tightly retain the fastener within the attachment implement.

7. The attachment implement as set forth in claim 6, further comprising:

a third axially central passageway defined within said attachment implement and openly connected to said second axially central chamber for guidably receiving the fastener when the fastener is driven into said attachment implement and the underlying structural substrate so as to fixedly mount the insulation panel upon the underlying structural substrate.

8. The attachment implement as set forth in claim 1, wherein:

a plurality of apertures are defined within radially outer portions of said washer plate member and adjacent to a peripheral edge portion thereof for imparting flexibility to said washer plate member and to accommodate a finishing coating material to be applied over said washer plate member and the insulation panel whereby adherence of the finishing coating to the insulation panel is enhanced.

9. The attachment implement as set forth in claim 1, wherein:

a first upper surface portion of said washer plate member is substantially planar; and a second lower surface portion of said washer plate member tapers axially away from said first upper planar surface portion such that said washer plate member exhibits increased thickness as one proceeds in the radially inward direction extending from an outer peripheral edge portion of said washer plate member toward said central axis of said washer plate member.

10. The attachment implement as set forth in claim 1, wherein:

an outer surface portion of said washer plate member comprises a plurality of dimpled regions for enhancing the retention of a finishing coating to be applied over said washer plate member and the insulation panel.

11. An attachment implement for attaching an insulation panel to an underlying structural substrate, comprising:

a washer plate member, having a predetermined diametrical extent defined around a central axis, for engaging an outer surface portion of an insulation panel to be secured to an underlying structural substrate; and a body portion integrally connected to a substantially axial central region of said washer plate member wherein said body portion has a substantially inverted, rounded bell-shaped configuration comprising radiused external surface regions circumferentially symmetrical around said central axis and defining a substantially bell-shaped curve in cross-section for uniformly distributing the compressive forces, attendant the mounting of the insulation panel upon the underlying structural substrate, in a radially outwardly direction, and for engaging the insulation panel so as to be capable of compressing the insulation panel without damaging the same by otherwise axially concentrated forces.

12. The attachment implement as set forth in claim 11, wherein:

an annular chamber is defined within said washer plate member for accommodating an adapter pilot implement of a power tool which is used for driving a fastener into the attachment implement and the underlying structural substrate so as to securely mount the insulation panel upon the underlying structural substrate.

13. The attachment implement as set forth in claim 12, wherein:

said annular chamber is defined within an outer surface portion of said washer plate member.

14. The attachment implement as set forth in claim 12, wherein:

a first axially central chamber defined within said attachment implement for accommodating a muzzle portion of the power tool and thereby operatively cooperating with said annular chamber defined within said washer plate member for accommodating the adapter pilot implement of the power tool such that the power tool is properly positioned and seated with respect to said attachment implement in order to properly drive a fastener into the attachment implement and the underlying structural substrate so as to securely mount the insulation panel upon the underlying structural substrate.

15. The attachment implement as set forth in claim 14, wherein:

a plurality of resilient fingers radially separate said annular chamber from said first axially central chamber and include substantially trapezoidal configured portions which partially overhang said first axially central chamber.

16. The attachment implement as set forth in claim 14, further comprising:

a second axially central chamber defined within said attachment implement and openly connected to said first axially central chamber for accommodating a collating ring operatively associated with the fastener in order to tightly retain the fastener within the attachment implement.

17. The attachment implement as set forth in claim 16, further comprising:

a third axially central passageway defined within said attachment implement and openly connected to said second axially central chamber for guidably receiving the fastener when the fastener is driven into said attachment implement and the underlying structural substrate so as to fixedly mount the insulation panel upon the underlying structural substrate.

18. The attachment implement as set forth in claim 11, wherein:

a plurality of apertures are defined within radially outer portions of said washer plate member and adjacent to a peripheral edge portion thereof for imparting flexibility to said washer plate member and to accommodate a finishing coating material to be applied over said washer plate member and the insulation panel whereby adherence of the finishing coating to the insulation panel is enhanced.

19. The attachment implement as set forth in claim 11, wherein:

a first upper surface portion of said washer plate member is substantially planar; and a second lower surface portion of said washer plate member tapers axially away from said first upper planar surface portion such that said washer plate member exhibits increased thickness as one proceeds in the radially inward direction extending from an outer peripheral edge portion of said washer plate member toward said central axis of said washer plate member.

20. The attachment implement as set forth in claim 11, wherein:

an outer surface portion of said washer plate member comprises a plurality of dimpled regions for enhancing the retention of a finishing coating to be applied over said washer plate member and the insulation panel.

\* \* \* \* \*